(12) United States Patent
Ling et al.

(10) Patent No.: US 7,340,983 B2
(45) Date of Patent: Mar. 11, 2008

(54) SPANNER WITH PREVENTION OF DISENGAGEMENT OF FASTENERS

(75) Inventors: David Ling, Taichung (TW); Hsien-Chung Tuan-Mu, Taichung (TW)

(73) Assignee: Easco Hand Tools, Inc., Simsbury, CT (US)

( * ) Notice: Subject to any disclaimer, the term of this patent is extended or adjusted under 35 U.S.C. 154(b) by 0 days.

(21) Appl. No.: 10/879,923

(22) Filed: Jun. 28, 2004

(65) Prior Publication Data

US 2004/0231469 A1   Nov. 25, 2004

Related U.S. Application Data

(63) Continuation of application No. 10/689,259, filed on Oct. 20, 2003, now abandoned, which is a continuation of application No. 10/295,368, filed on Nov. 15, 2002, now abandoned, which is a continuation of application No. 09/820,061, filed on Mar. 28, 2001, now abandoned, which is a continuation-in-part of application No. 09/599,206, filed on Jun. 22, 2000, now abandoned.

(51) Int. Cl.
*B25B 13/00* (2006.01)

(52) U.S. Cl. ............... 81/124.3; 81/60; 81/63.2; 81/121.1; 81/124.7; 81/186

(58) Field of Classification Search .......... 81/60–63.2, 81/121.1, 124.3, 124.7, 186; D8/28
See application file for complete search history.

(56) References Cited

U.S. PATENT DOCUMENTS

| | | | |
|---|---|---|---|
| 2,769,360 A | 11/1956 | Cottrell et al. ............... 81/121 |
| 3,324,748 A * | 6/1967 | Williams ................... 81/124.3 |
| 3,877,327 A | 4/1975 | Erm ........................... 81/121 |
| 4,111,077 A | 9/1978 | Cummings et al. ............ 81/63 |
| 4,722,252 A | 2/1988 | Fulcher et al. ............. 81/57.39 |
| 4,840,094 A | 6/1989 | Macor ......................... 81/185 |
| D303,069 S | 8/1989 | Heberlie ...................... D8/24 |
| 5,230,263 A | 7/1993 | Kwaka ..................... 81/125.1 |
| 5,255,578 A | 10/1993 | Liou ........................... 81/125 |
| 5,307,713 A | 5/1994 | White ....................... 81/180.1 |
| 5,782,148 A | 7/1998 | Kerkhoven ............... 81/124.6 |
| 5,865,074 A | 2/1999 | Hsieh ....................... 81/124.3 |
| 5,946,989 A * | 9/1999 | Hsieh ....................... 81/124.3 |
| 5,983,758 A | 11/1999 | Tanner ...................... 81/124.3 |
| 6,003,411 A | 12/1999 | Knox et al. ................ 81/53.2 |
| 6,089,127 A | 7/2000 | Dominguez ................ 81/119 |
| 6,629,477 B2 | 10/2003 | Ling et al. ................. 81/63.2 |

FOREIGN PATENT DOCUMENTS

| | | |
|---|---|---|
| DE | 29706014 U1 | 7/1997 |
| WO | WO99/07519 | 2/1999 |

* cited by examiner

*Primary Examiner*—Joseph J. Hail, III
*Assistant Examiner*—Shantese L. McDonald
(74) *Attorney, Agent, or Firm*—Nelson Mullins Riley & Scarborough, LLP

(57) ABSTRACT

A spanner comprises a box end that has an inner periphery consisting of a number of wall faces to define a first polygonal receiving space. Each wall face includes a groove defined therein. The grooves of the wall faces together define a second polygonal receiving space. At least one of the grooves includes a closed first end and an open second end.

41 Claims, 14 Drawing Sheets

SPANNER WITH PREVENTION OF DISENGAGEMENT OF FASTENERS

CROSS-REFERENCE TO RELATED APPLICATIONS

The present application is a continuation of, and claims priority to, U.S. patent application Ser. No. 10/689,259, filed Oct. 20, 2003, now abandoned, which is a continuation of U.S. patent application Ser. No. 10/295,368, filed Nov. 15, 2002, now abandoned which is a continuation of U.S. patent application Ser. No. 09/820,061, filed Mar. 28, 2001, now abandoned, which is a continuation-in-part application of U.S. patent application Ser. No. 09/599,206, filed on Jun. 22, 2000, now abandoned, the entire disclosures of which are incorporated by reference herein.

BACKGROUND OF THE INVENTION

The present invention relates to a spanner that may prevent disengagement of fasteners during operation.

FIG. 1 of the drawings illustrates a conventional spanner with a box end. When in use, a nut (or bolt head) is held in the box end of the spanner, as shown in FIG. 2. Nevertheless, as shown in FIGS. 3 and 4, the nut tends to move out of the box end such that the outer periphery of the nut is apt to be damaged and thus cannot be used anymore. Applicant's U.S. patent application Ser. No. 09/599,206. proposes an improved spanner for retaining fasteners in place during operation. However, such a spanner cannot be used in a case that the spanner must be passed through, e.g., a nut for driving, e.g., a bolt head to which the nut is engaged when the bolt head is located at a place that is difficult or impossible to access from the other side.

SUMMARY OF THE INVENTION

It is the primary object of the present invention to provide a spanner that may retain fasteners in place during operation.

It is another object of the present invention to provide a spanner that can be passed through, e.g., a nut to drive, e.g., a bolt head to which the nut is engaged when the bolt head is located at a place that is difficult or impossible to access from the other side.

In accordance with one aspect of the invention, a spanner comprises a box end that has an inner periphery consisting of a plurality of wall faces to define a first polygonal receiving space. Each wall face includes a groove defined therein. The grooves of the wall faces together define a second polygonal receiving space. At least one of the grooves includes a closed first end and an open second end.

In accordance with another aspect of the invention, a spanner comprises a box end and a drive member rotatably mounted in the box end. The drive member comprises an inner periphery consisting of a plurality of wall faces to define a first polygonal receiving space. Each wall face includes a groove defined therein. The grooves of the wall faces together define a second polygonal receiving space. At least one of the grooves includes a closed first end and an open second end.

Each groove is preferably triangular and includes a closed first end and an open second end. The first polygonal receiving space and the second polygonal space are triangular, square, hexagonal, or octagonal. In addition, the first polygonal receiving space may have an angular positional difference of 60°, 45°, 30°, or 22.5° from the second polygonal receiving space.

Other objects, advantages, and novel features of the invention will become more apparent from the following detailed description when taken in conjunction with the accompanying drawings.

DETAILED DESCRIPTION OF THE DRAWINGS

Figure 1:
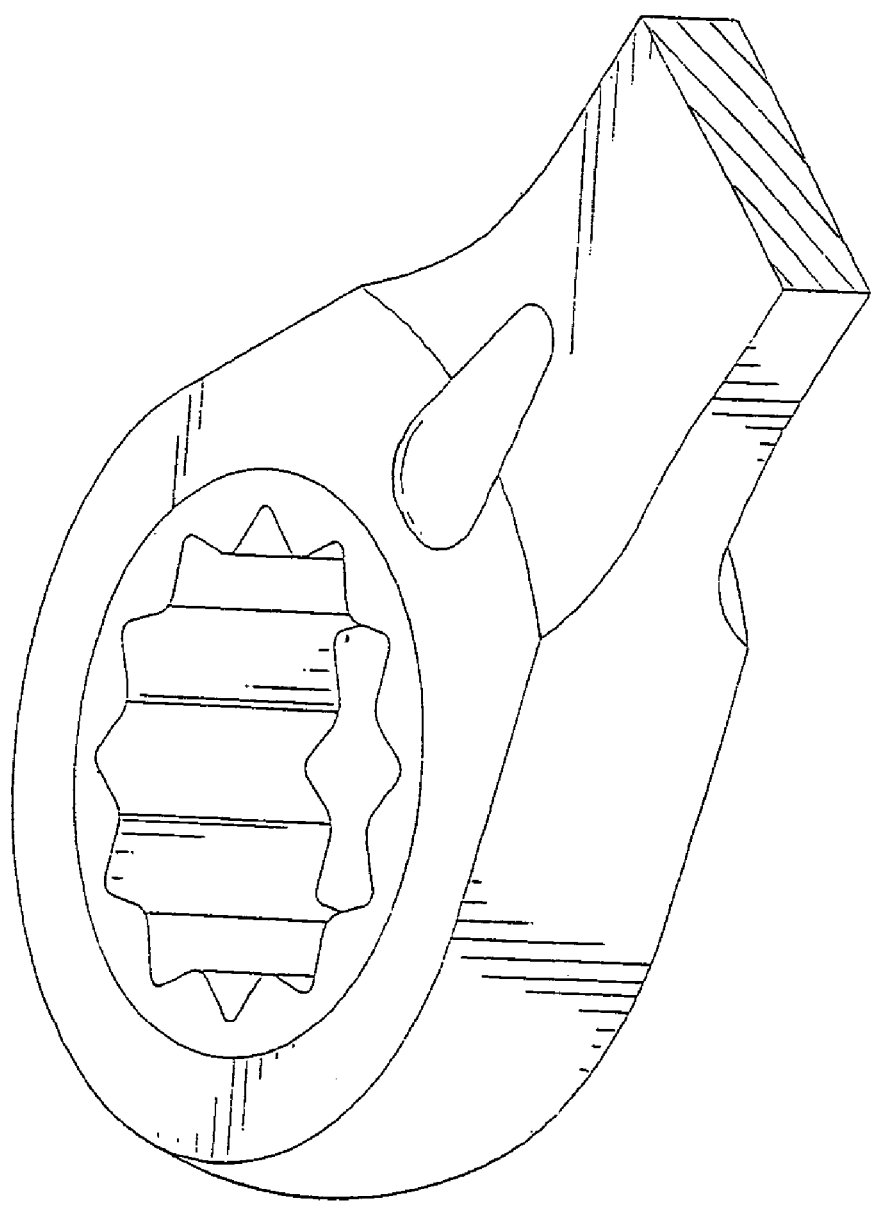
FIG. 1 is a partial perspective view of a box end of a conventional spanner.
Figure 2:
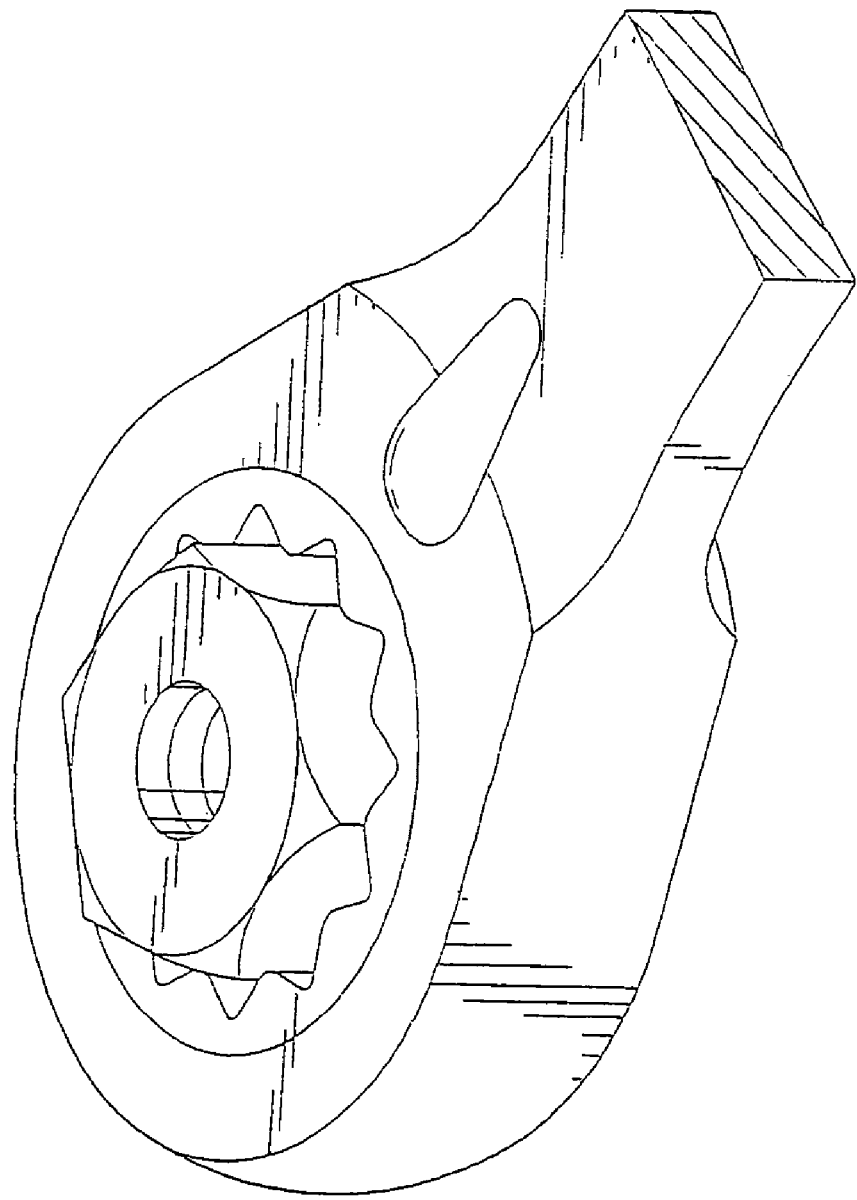
FIG. 2 is a partial perspective view illustrating use of the conventional spanner in FIG. 1.
Figure 3:
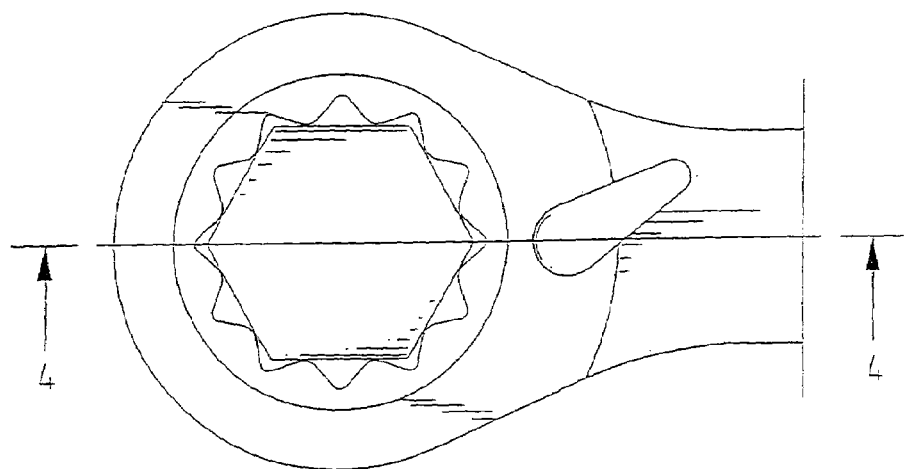
FIG. 3 is a partial top view of the conventional spanner in FIG. 2.
Figure 4:
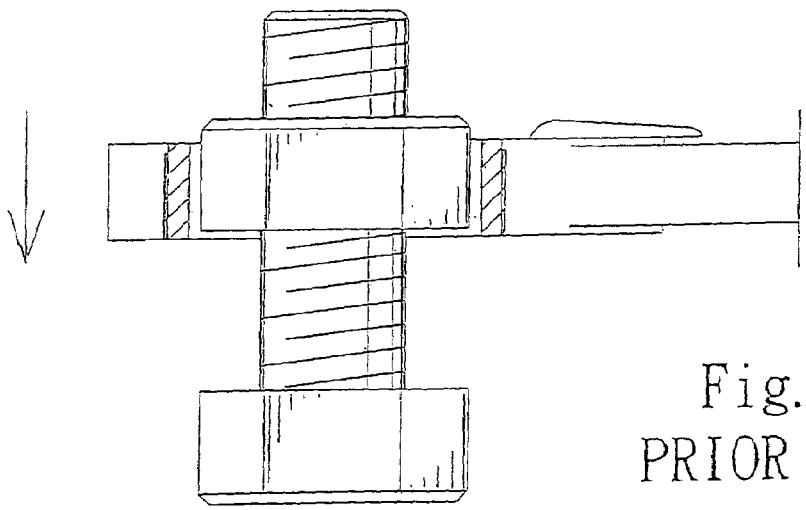
FIG. 4 is a partial sectional view taken alone line 4-4 in FIG.

Referring to FIGS. 5 through 21 and initially to FIGS. 5 through 9, a first embodiment of a spanner 10 in accordance with the present invention generally includes a box end 11 in which a drive member 12 is rotatably mounted. The drive member 12 includes an inner periphery for driving a fastener, such as a nut or bolt head. In this embodiment, the inner periphery of the drive member 12 has six wall faces 13. The spanner 10 may further include a switch piece 17 for changing ratcheting direction for driving fasteners, such as nuts, bolt heads, etc. Namely, the spanner may be a ratchet-type spanner allowing a change in the ratcheting direction. Of course, the spanner may include two box ends or be of any other type having a box end with a structure disclosed in this specification.

Figure 5:
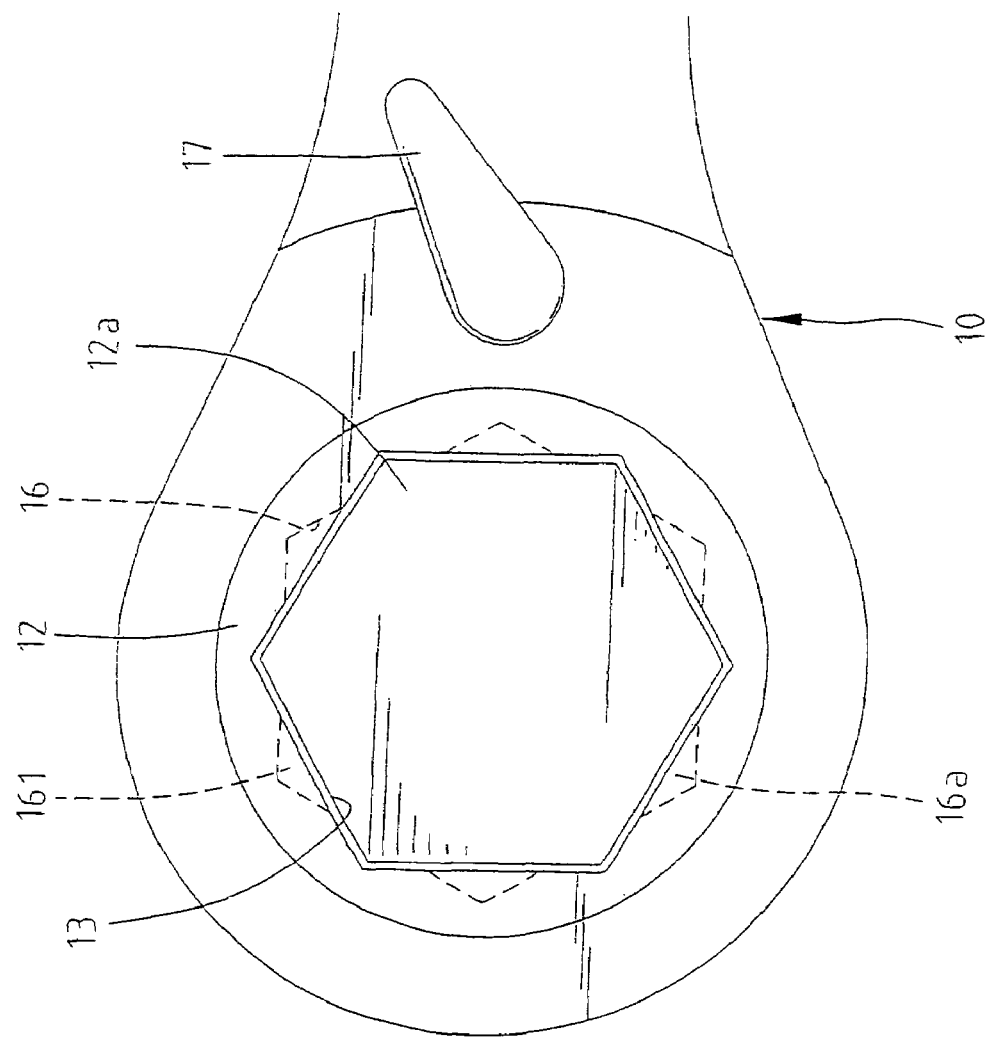
FIG. 5 is a partial top view of a first embodiment of a box end of a spanner in accordance with the present invention.
Figure 6:
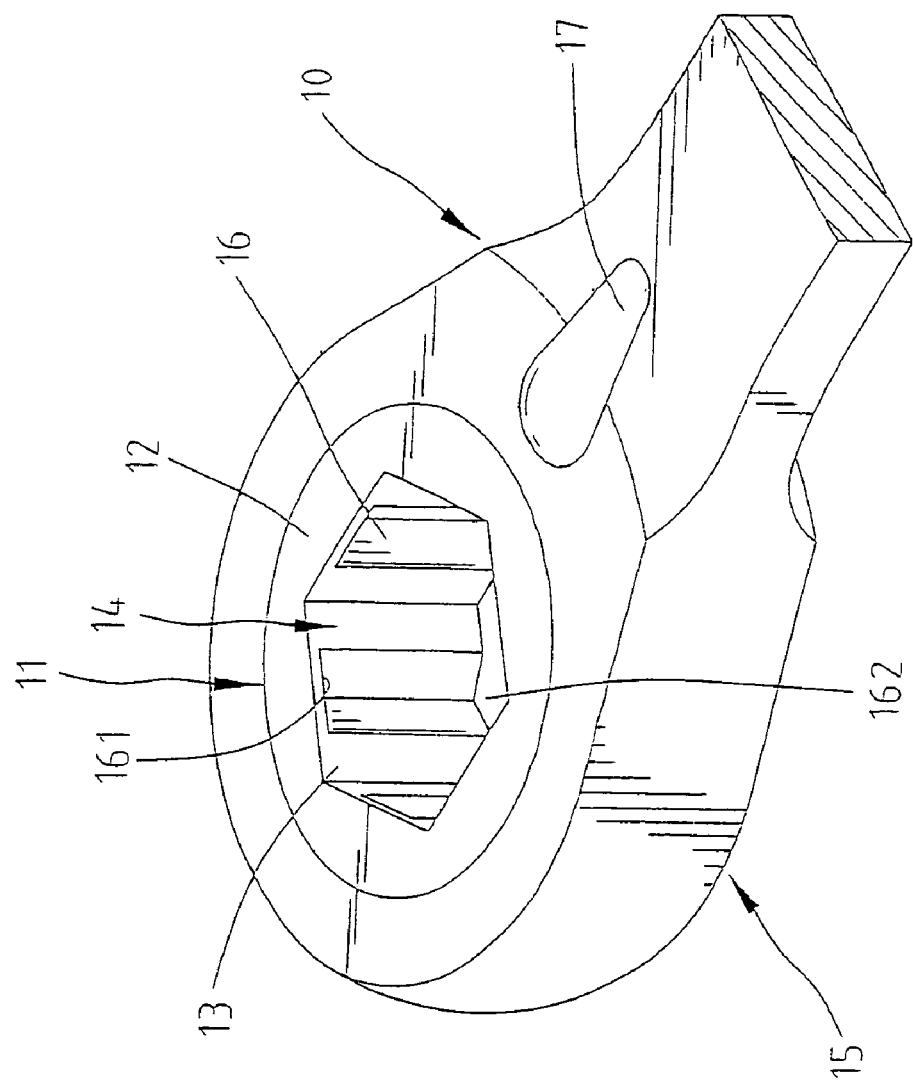
FIG. 6 is a partial perspective view of the box end of the spanner in FIG. 5.
Figure 7:
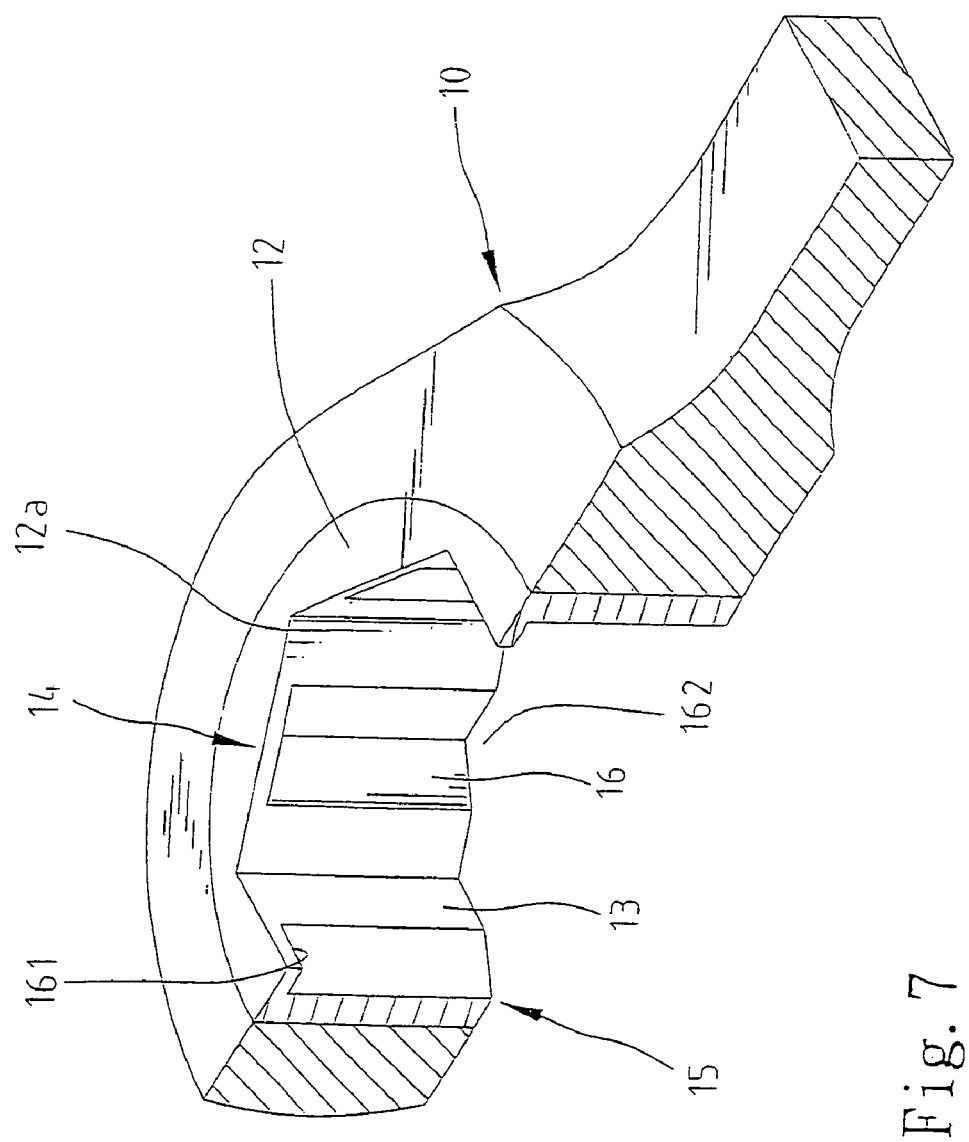
FIG. 7 is a partial perspective view, partly cutaway, of the box end of the spanner in FIG. 6.

The inner periphery of the drive member 12 defines a receiving space 12a (FIG. 7) having a first open end 14 and a second open end 15. As illustrated in FIGS. 5 through 7, each wall face 13 of the drive member 12 includes a triangular groove 16 having a closed first end 161 that is adjacent to the first open end 14 and an open second end 162 (FIG. 7) that is adjacent to the second open end 15. As illustrated in FIG. 5, the six triangular grooves 16 together define a hexagonal receiving space 16a (FIG. 5) that has an angular positional difference of, e.g., 30° from the receiving space 12a defined by the inner periphery of the drive member 12.

Figure 8:
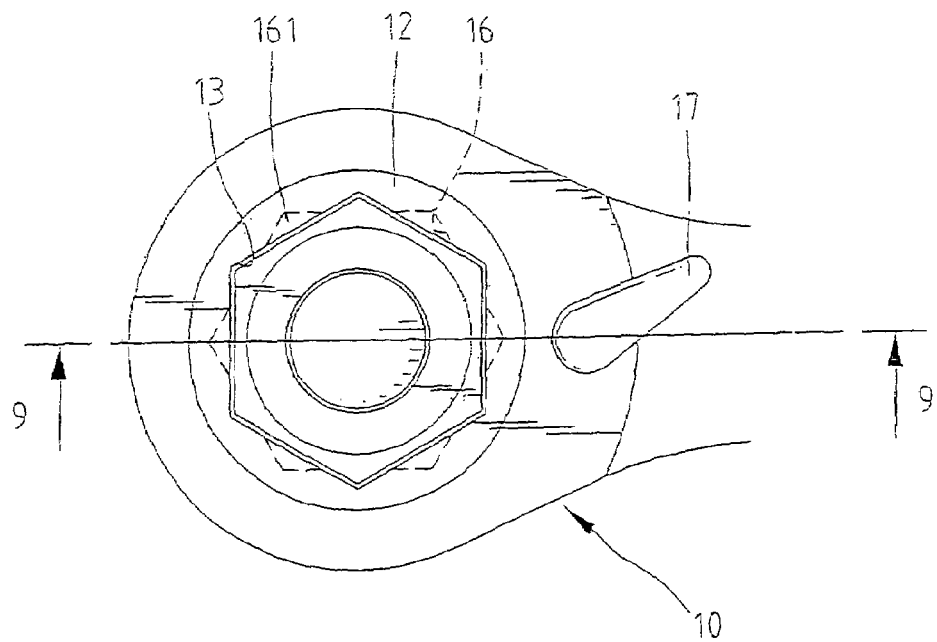
FIG. 8 is a partial top view of the box end of the spanner in FIG. 5.
Figure 9:
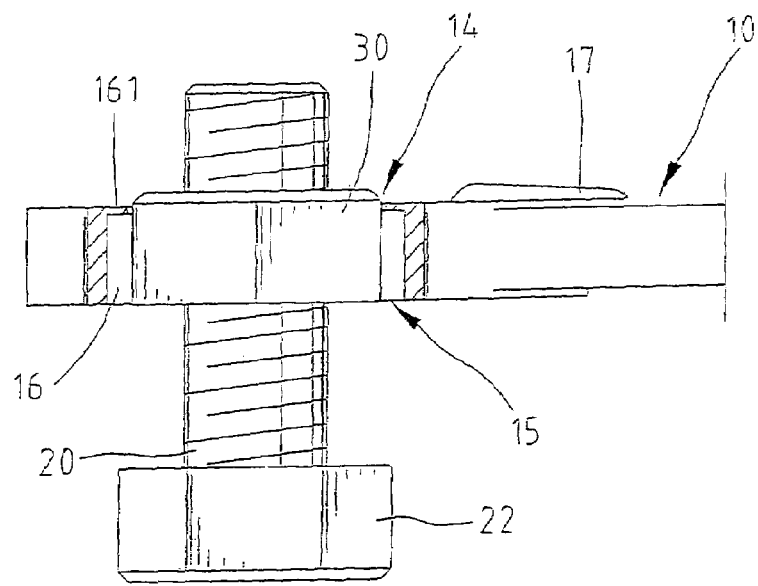
FIG. 9 is a sectional view taken along line 9-9 in FIG. 8.
Figure 10:
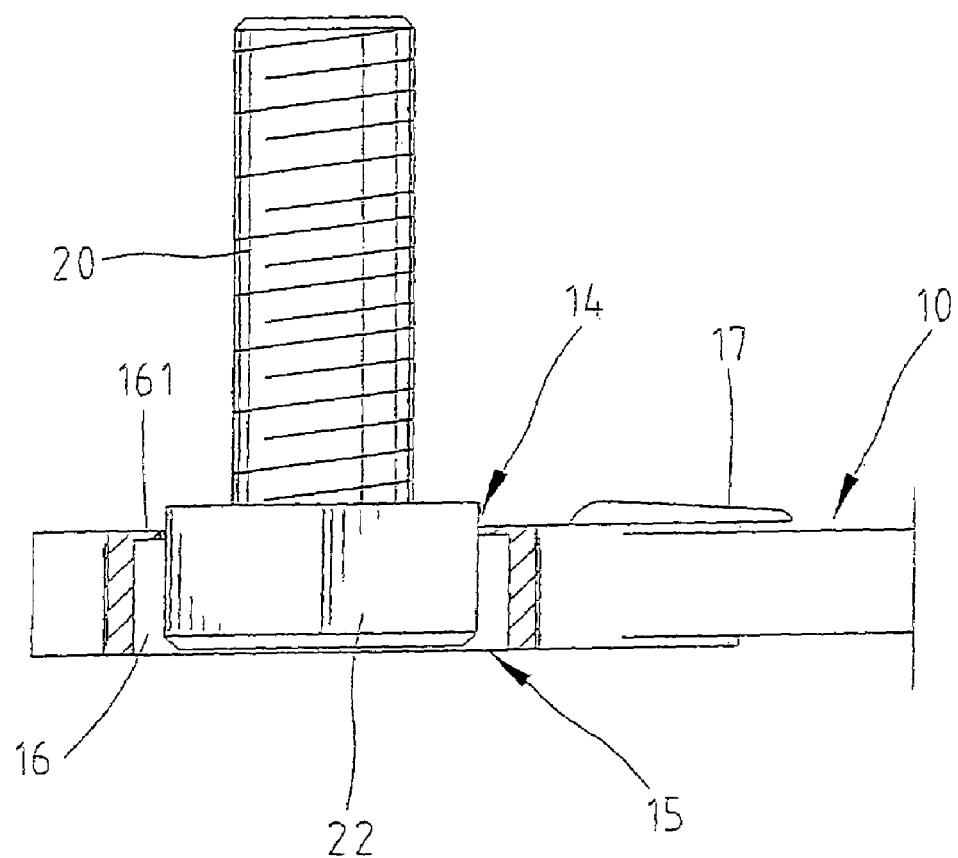
FIG. 10 is a partial sectional view similar to FIG. 9, wherein the spanner is engaged with the bolt head.

In use, the spanner can be used as a normal spanner in which a nut 30 to be tightened or loosened is received in the receiving space 12a defined by the inner periphery of the drive member 12, as shown in FIGS. 8 and 9. Nevertheless, the spanner can be passed through the nut 30 to engage with a bolt head 22 of a bolt 20 to which the nut 30 is engaged, as shown in FIG. 10. Thus, the spanner can be used to drive the bolt head 22. This is particularly advantageous when the bolt head 22 is located at a place that is difficult or impossible to access from the other side (the lower side in FIG. 10).

Figure 11:
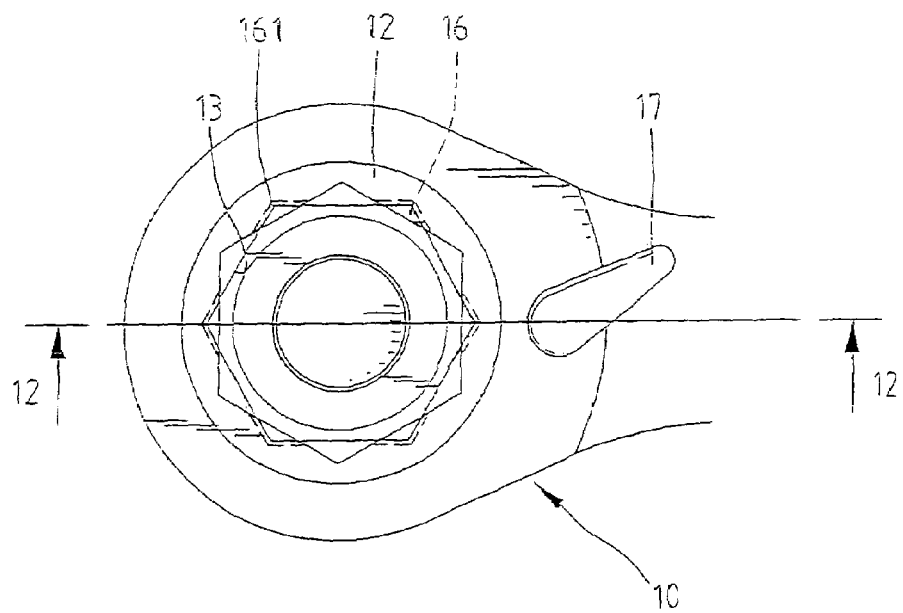
FIG. 11 is a partial top view of the box end of the spanner, illustrating another use of the spanner.
Figure 12:
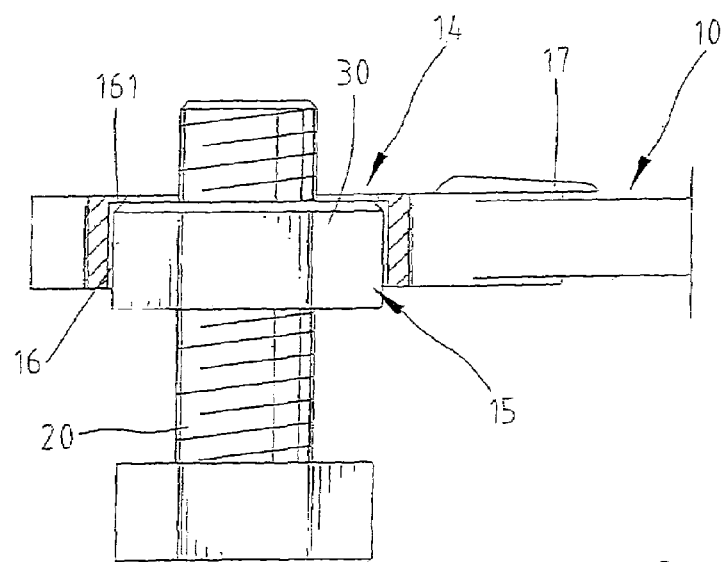
FIG. 12 is a partial sectional view taken along line 12-12 of FIG. 11.

In addition, the spanner can be used in a manner that the nut 30 is received in the receiving space 16a defined by the triangular grooves 16, as shown in FIGS. 11 and 12. It is noted that the nut 30 bears against the end walls of the first closed ends 161 of the triangular grooves 16 during loosening or tightening. Namely, the nut 30 is stopped by the end walls of the first closed ends 161 of the triangular grooves 16. Accordingly, disengagement of the nut 30 during operation is prevented.

Figure 13:
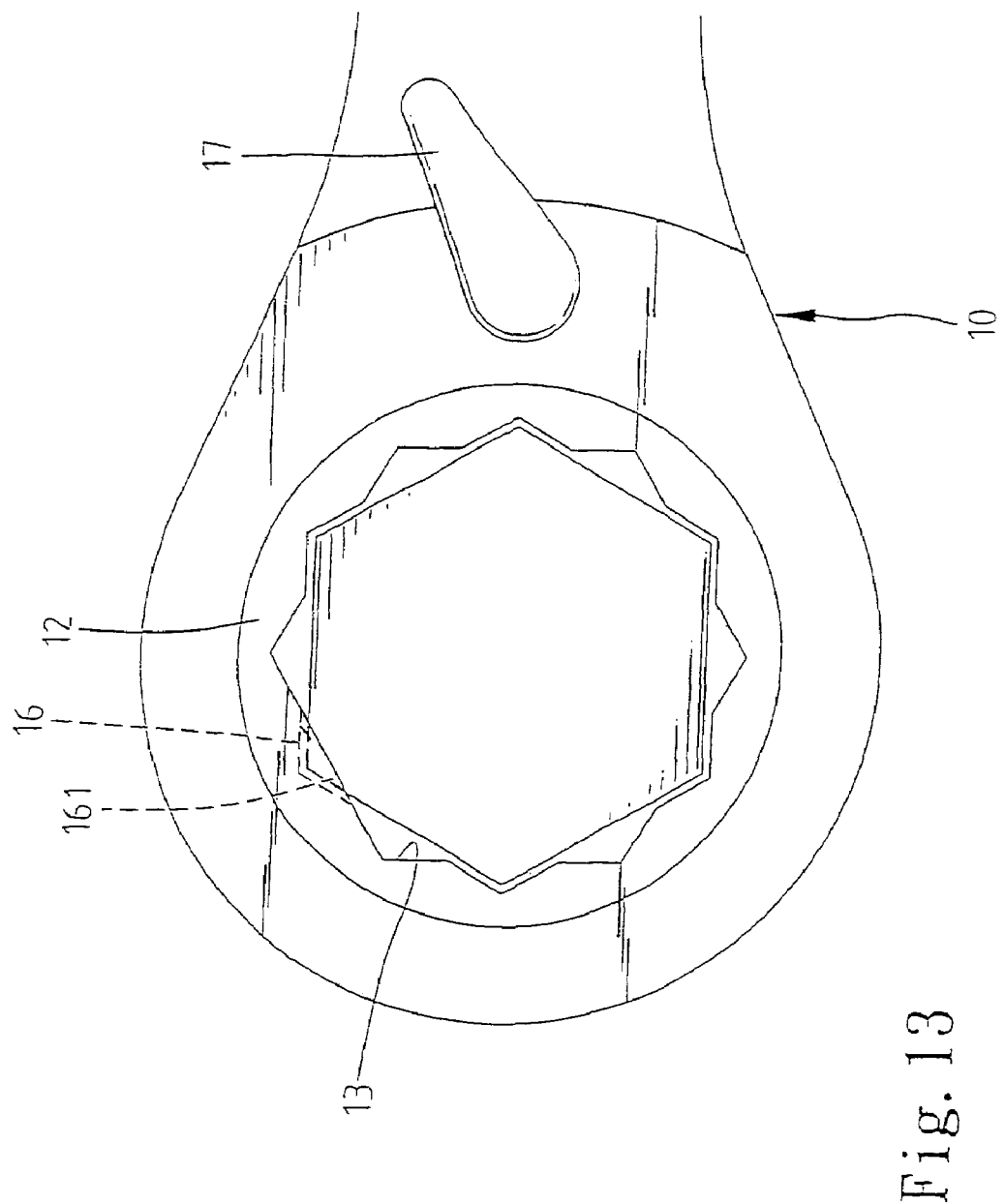
FIG. 13 is a partial top view of a second embodiment of the box end of the spanner in accordance with the present invention.

FIG. 13 illustrates a second embodiment of the box end of the spanner 10, wherein only one of the triangular grooves 16 includes a closed first end 161 and an open second end; i.e., each of the other five triangular grooves 16 has an open first end and a second open end.

Figure 14:
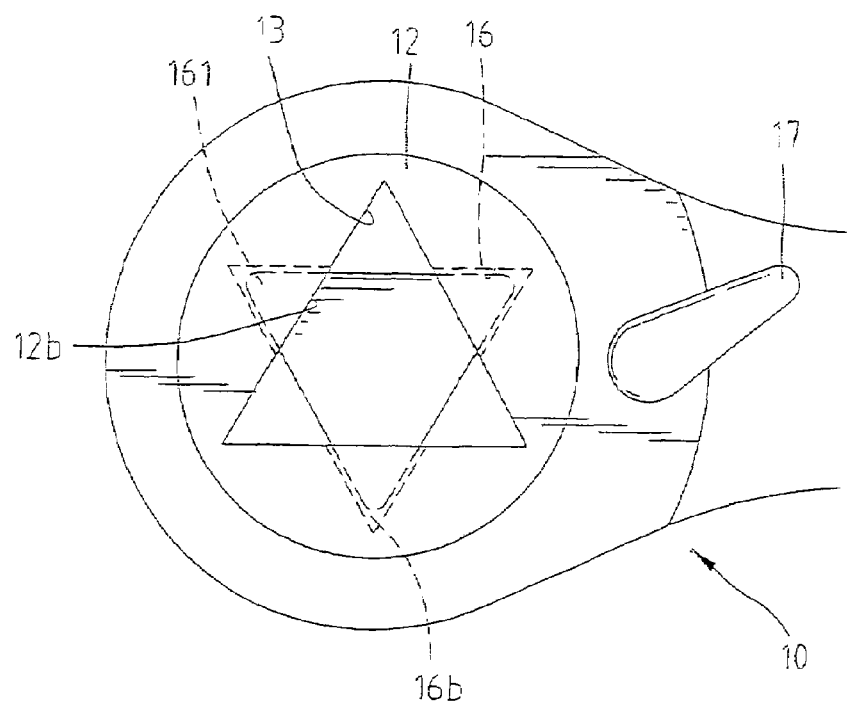
FIG. 14 is a partial top view of a third embodiment of the box end of the spanner in accordance with the present invention.
Figure 15:
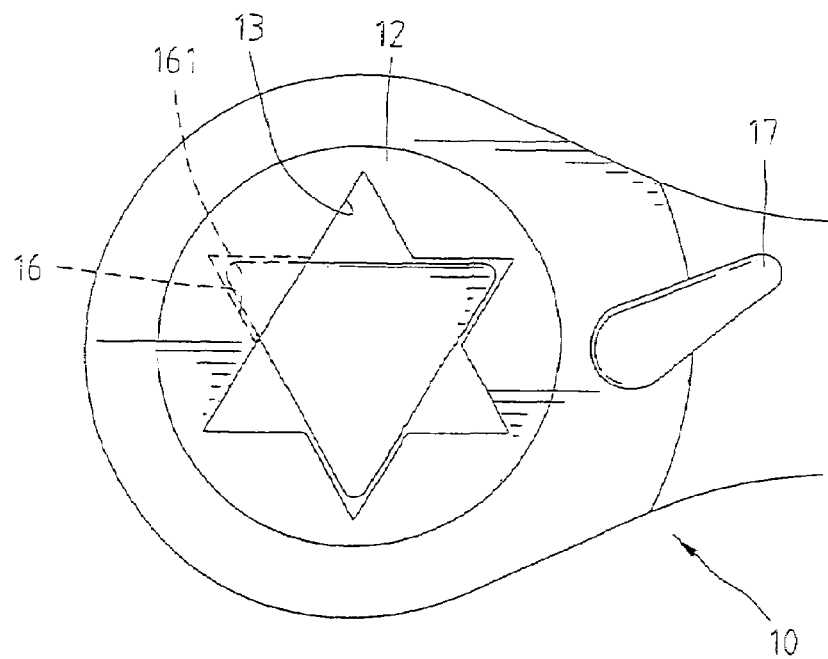
FIG. 15 is a partial top view of a fourth embodiment of the box end of the spanner in accordance with the present invention.

FIG. 14 illustrates a third embodiment of the box end of the spanner 10, wherein the inner periphery of the drive member 12 is triangular and includes three wall faces 13. Each wall face 13 includes a triangular groove 16 having a closed first end 161 and an open second end (not shown). The three triangular grooves 16 together define a triangular receiving space 16b that has an angular positional difference of, e.g., 60° from a triangular receiving space 12b defined by the inner periphery of the drive member 12. FIG. 15 illustrates a fourth embodiment of the box end of the spanner 10 that is modified from the third embodiment of FIG. 14, wherein only one of the triangular grooves 16 includes a closed first end 161 and an open second end; i.e., each of the other two triangular grooves 16 has an open first end and a second open end. The spanners shown in FIGS. 14 and 15 can be used to drive triangular fasteners.

Figure 16:
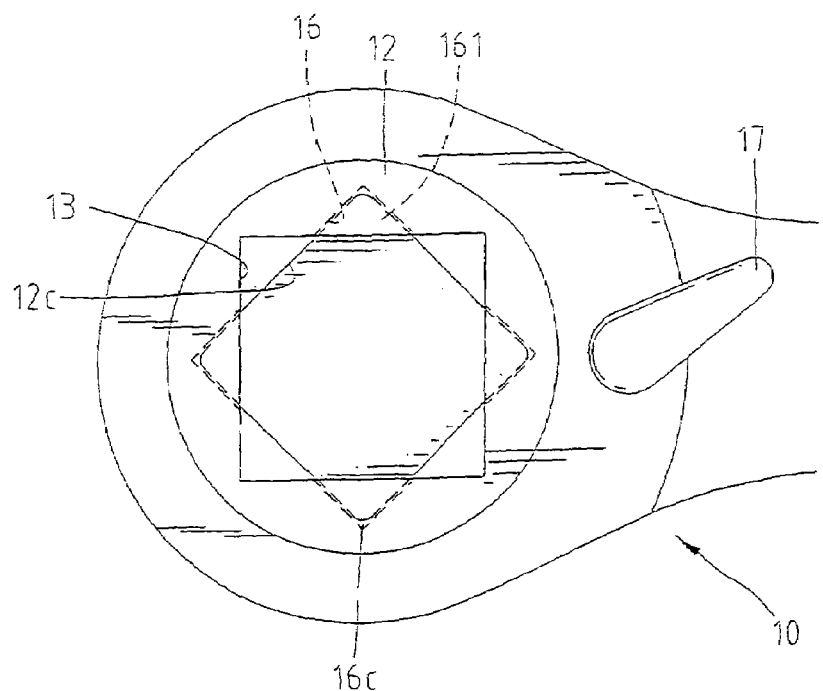
FIG. 16 is a partial top view of a fifth embodiment of the box end of the spanner in accordance with the present invention.
Figure 17:
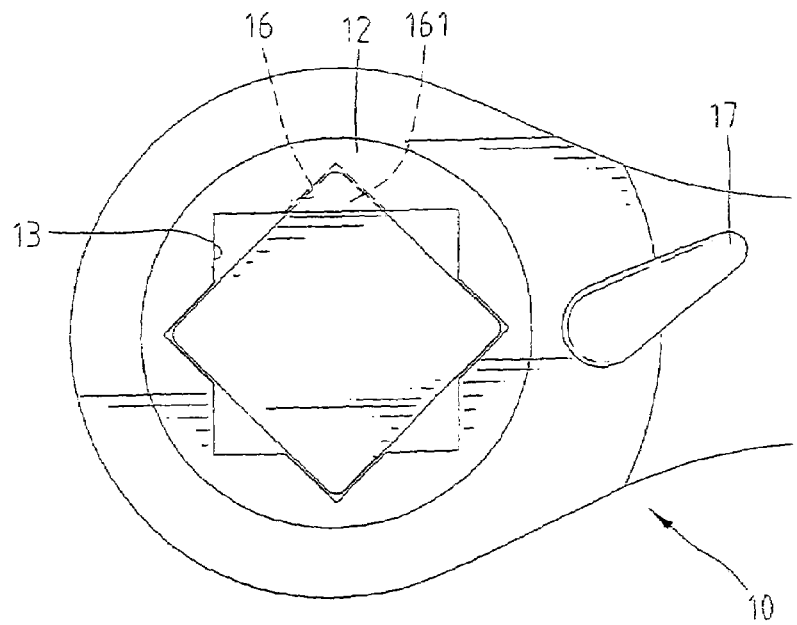
FIG. 17 is a partial top view of a sixth embodiment of the box end of the spanner in accordance with the present invention.

FIG. 16 illustrates a fifth embodiment of the box end of the spanner 10, wherein the inner periphery of the drive member 12 is square and includes four wall faces 13. Each wall face 13 includes a triangular groove 16 having a closed first end 161 and an open second end (not shown). The four triangular grooves 16 together define a square receiving space 16c that has an angular positional difference of, e.g., 45° from a square receiving space 12c defined by the inner periphery of the drive member 12. FIG. 17 illustrates a sixth embodiment of the box end of the spanner 10 that is modified from the fifth embodiment of FIG. 16, wherein only one of the triangular grooves 16 includes a closed first end 161 and an open second end; i.e., each of the other three triangular grooves 16 has an open first end and a second open end. The spanners shown in FIGS. 16 and 17 can be used to drive square fasteners.

Figure 18:
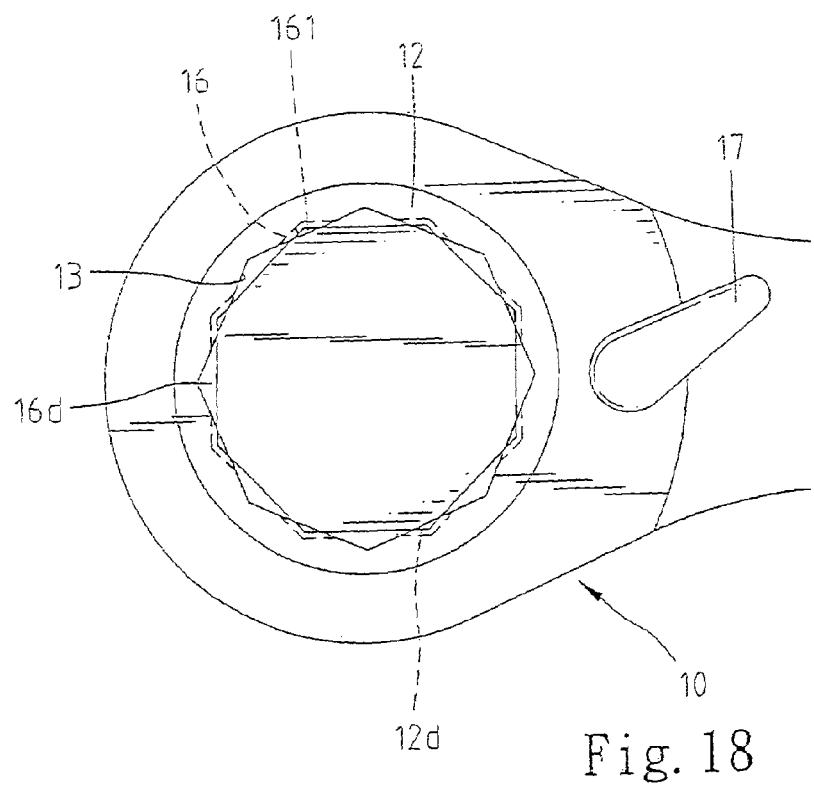
FIG. 18 is a partial top view of a seventh embodiment of the box end of the spanner in accordance with the present invention.
Figure 19:
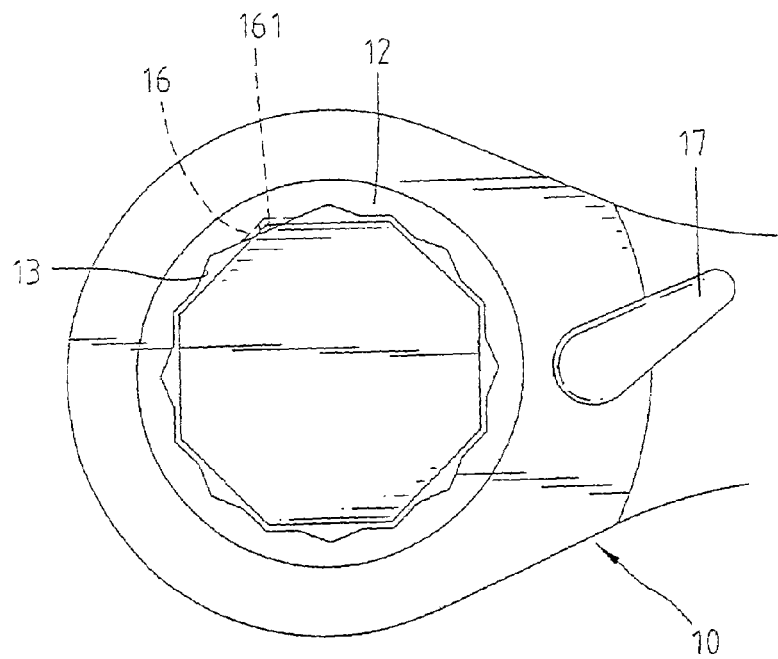
FIG. 19 is a partial top view of an eighth embodiment of the box end of the spanner in accordance with the present invention.

FIG. 18 illustrates a seventh embodiment of the box end of the spanner 10, wherein the inner periphery of the drive member 12 is octagonal and includes eight wall faces 13. Each wall face 13 includes a triangular groove 16 having a closed first end 161 and an open second end (not shown). The eight triangular grooves 16 together define an octagonal receiving space 16d that has an angular positional difference of, e.g., 22.5° from an octagonal receiving space 12d defined by the inner periphery of the drive member 12. FIG. 19 illustrates an eighth embodiment of the box end of the spanner 10 that is modified from the seventh embodiment of FIG. 18, wherein only one of the triangular grooves 16 includes a closed first end 161 and an open second end; i.e., each of the other seven triangular grooves 16 has an open first end and a second open end. The spanners shown in FIGS. 18 and 19 can be used to drive octagonal fasteners.

Figure 20:
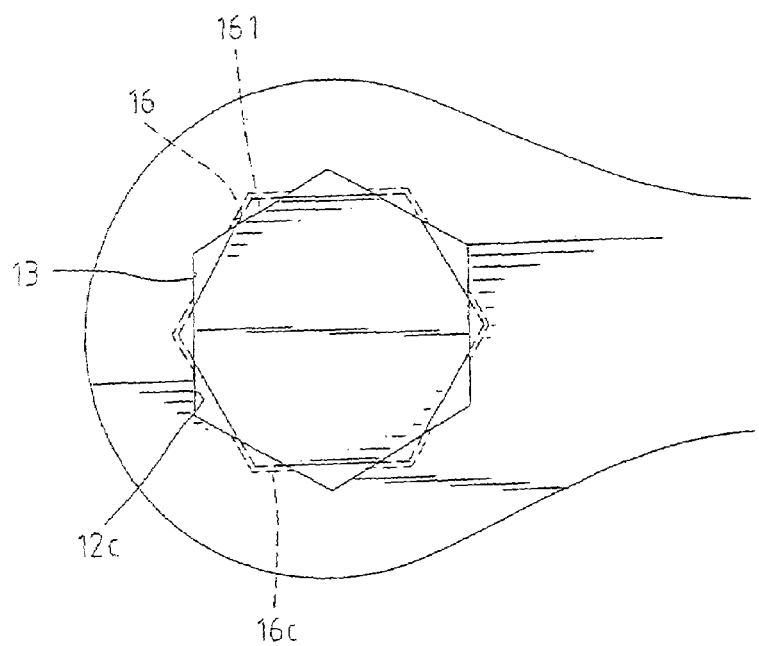
FIG. 20 is a partial top view of a ninth embodiment of the box end of the spanner in accordance with the present invention.
Figure 21:
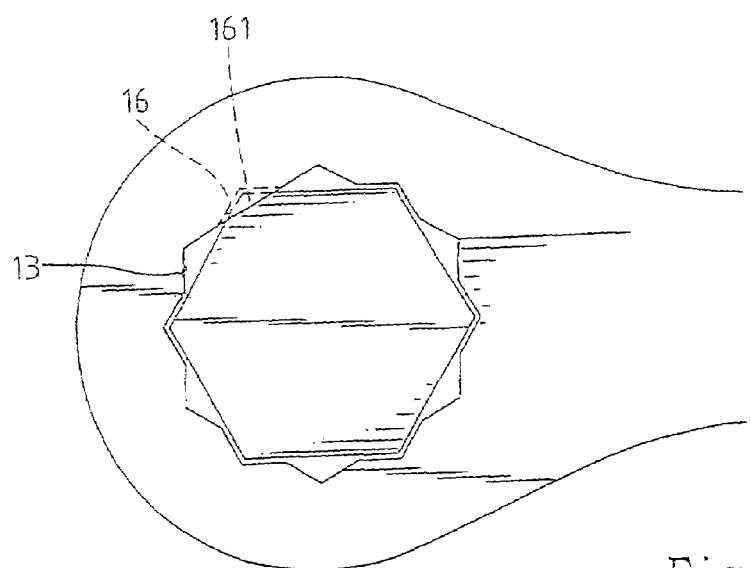
FIG. 21 is a top view of a tenth embodiment of the box end of the spanner in accordance with the present invention.

FIG. 20 illustrates a ninth embodiment of the box end of the spanner 10, wherein the box end has no drive member mounted therein. Instead, the box end of the spanner 10 includes an inner periphery having, e.g., six wall faces 13. Each wall face 13 includes a triangular groove 16 having a closed first end 161 and an open second end (not shown). The six triangular grooves 16 together define a hexagonal receiving space 16a that has an angular positional difference of, e.g., 30° from a hexagonal receiving space 12a defined by the inner periphery of the box end of the spanner. FIG. 21 illustrates a tenth embodiment of the box end of the spanner 10 that is modified from the ninth embodiment of FIG. 20, wherein only one of the triangular grooves 16 includes a closed first end 161 and an open second end; i.e., each of the other five triangular grooves 16 has an open first end and a second open end. The spanners shown in FIGS. 20 and 21 can be used to drive hexagonal fasteners.

According to the above descriptions, it is appreciated that the spanners in accordance with the present invention can be used in three different manners in response to different needs.

Although the invention has been explained in relation to its preferred embodiment, it is to be understood that many other possible modifications and variations can be made without departing from the scope of the invention as hereinafter claimed.

What is claimed:
1. A spanner wrench comprising:
 a. a handle;
 b. a head attached to said handle that defines a box end having
  an inner periphery having a plurality of wall faces connected by a first plurality of corners, said wall faces and said first plurality of corners defining a first polygonal receiving space bounded at the top by a first open end and at the bottom by a second open end, each said wall face including at least one groove formed therein,
  a second polygonal receiving space defined by said grooves that is bounded at the top by said first open end and at the bottom by said second open end, and c. a radially inward extending ledge disposed within said first polygonal receiving space and located in a minority number of said first plurality of corners proximate said first open end, wherein, when a work piece is received in said first polygonal receiving space, said radially inward extending ledges prevent said work piece from passing through said first open end, and when said work piece is received in said second polygonal receiving space, said work piece can pass through said first open end.

2. The spanner wrench of claim 1, wherein a cross-section of said grooves are triangularly shaped.

3. The spanner wrench of claim 1, wherein said first polygonal receiving space and said second polygonal receiving space are triangular.

4. The spanner wrench of claim 3, wherein said first corners have an angular positional difference of 60° from said grooves with respect to the centerline of said box end.

5. The spanner wrench of claim 1, wherein said first polygonal receiving space and said second polygonal receiving space are square.

6. The spanner wrench of claim 5, wherein said first corners have an angular positional difference of 45° from said grooves with respect to the centerline of said box end.

7. The spanner wrench of claim 1, wherein said first polygonal receiving space and said second polygonal receiving space are hexagonal.

8. The spanner wrench of claim 7, wherein said first corners have an angular positional difference of 30° from said grooves with respect to the centerline of said box end.

9. The spanner wrench of claim 1, wherein said first polygonal receiving space and said second polygonal receiving space are octagonal.

10. The spanner wrench of claim 9, wherein said first corners have an angular positional difference of 22.5° from said grooves with respect to the centerline of said box end.

11. A spanner wrench comprising:

a. a handle;

b. a head attached to said handle and defining a hole therethrough;

c. a drive member rotatably received in said hole and having an inner periphery defining, a plurality of wall faces connected by a first plurality of corners, said wall faces and said first plurality of corners defining a first polygonal receiving space bounded at the top by a first open end and at the bottom by a second open end, each said wall face including at least one groove formed therein, a second polygonal receiving space defined by said grooves that is bounded at the top by said first open end and at the bottom by said second open end, and d. a radially inward extending ledge disposed within said first polygonal receiving space and located in a minority number of said first plurality of corners proximate said first open end wherein, when a work piece is received in said first polygonal receiving space, said radially inward extending ledges prevent said work piece from passing through said first open end, and when said work piece is received in said second polygonal receiving space, said work piece can pass through said first open end.

12. The spanner wrench of claim 11, wherein said grooves are triangularly shaped.

13. The spanner wrench of claim 11, wherein said first polygonal receiving space and said second polygonal receiving space are triangular.

14. The spanner wrench of claim 13, wherein said first corners have an angular positional difference of 60° from said grooves with respect to the centerline of said drive member.

15. The spanner wrench of claim 11, wherein said first polygonal receiving space and said second polygonal receiving space are square.

16. The spanner wrench of claim 15, wherein said first corners have an angular positional difference of 45° from said grooves with respect to the centerline of said drive member.

17. The spanner wrench of claim 11, wherein said first polygonal receiving space and said second polygonal receiving space are hexagonal.

18. The spanner wrench of claim 17, wherein said first corners have an angular positional difference of 30° from said grooves with respect to the centerline of said drive member.

19. The spanner wrench of claim 11, wherein said first polygonal receiving space and said second polygonal receiving space are octagonal.

20. The spanner wrench of claim 19 wherein said first corners have an angular positional difference of 22.5° from said grooves with respect to the centerline of said drive member.

21. A driving tool comprising:

a. a body having an inner periphery having a plurality of wall faces connected by a first plurality of corners, said wall faces and said first plurality of corners defining a first polygonal receiving space bounded at the top by a first open end and at the bottom by a second open end, each said wall face including at least one groove formed therein, a second polygonal receiving space defined by said grooves that is bounded at the top by said first open end and at the bottom by said second open end, and b. a radially inward extending ledge disposed within said first polygonal receiving space and located in a minority number of said first plurality of corners, wherein, when a work piece is received in said first polygonal receiving space, said radially inward extending ledges prevent said work piece from passing through said first open end, and when said work piece is received in said second polygonal receiving space, said work piece can pass through said first open end.

22. The driving tool of claim 21, wherein a cross-section of said grooves are triangularly shaped.

23. The driving tool of claim 21, wherein said first polygonal receiving space and said second polygonal receiving space are triangular.

24. The driving tool of claim 23, wherein each said first corner has an angular positional difference of 60° from said adjacent grooves.

25. The driving tool of claim 21, wherein said first polygonal receiving space and said second polygonal receiving space are square.

26. The driving tool of claim 25, wherein each said first corner has an angular positional difference of 45° from said adjacent grooves.

27. The driving tool of claim 21, wherein said first polygonal receiving space and said second polygonal receiving space are hexagonal.

28. The driving tool of claim 27, wherein each said first corner has an angular positional difference of 30° from said adjacent grooves.

29. The driving tool of claim 21, wherein said first polygonal receiving space and said second polygonal receiving space are octagonal.

30. The driving tool of claim 29, wherein each said first corner has an angular positional difference of 22.5° from said adjacent grooves.

31. A driving tool comprising:
   a. a body having
      an inner periphery having a plurality of wall faces connected by a first plurality of corners, said wall faces and said first plurality of corners defining a first polygonal receiving space bounded at the top by a first end and at the bottom by a second open end, each said wall face including at least one groove formed therein,
      a second polygonal receiving space defined by said grooves that is bounded at the top by said first end and at the bottom by said second open end, and
   b. a radially inward extending ledge disposed within said first polygonal receiving space and located in a minority number of said first plurality of corners,
   wherein,
      when a work piece is received in said first polygonal receiving space, said radially inward extending ledges prevent said work piece from passing along said first polygonal receiving space toward said first end, and
      when said work piece is received in said second polygonal receiving space, said work piece can pass along said second polygonal receiving space beyond said radially extending ledges toward said first end.

32. The driving tool of claim 31, wherein a cross-section of said grooves are triangularly shaped.

33. The driving tool of claim 31, wherein said first polygonal receiving space and said second polygonal receiving space are triangular.

34. The driving tool of claim 33, wherein each said first corner has an angular positional difference of 60° from said adjacent grooves.

35. The driving tool of claim 31, wherein said first polygonal receiving space and said second polygonal receiving space are square.

36. The driving tool of claim 35, wherein each said first corner has an angular positional difference of 45° from said adjacent grooves.

37. The driving tool of claim 31, wherein said first polygonal receiving space and said second polygonal receiving space are hexagonal.

38. The driving tool of claim 37, wherein each said first corner has an angular positional difference of 30° from said adjacent grooves.

39. The driving tool of claim 31, wherein said first polygonal receiving space and said second polygonal receiving space are octagonal.

40. The driving tool of claim 39, wherein each said first corner has an angular positional difference of 22.5° from said adjacent grooves.

41. A spanner wrench comprising:
   a. a handle;
   b. a head attached to said handle that defines a box end having
      an inner periphery having at least seven wall faces connected by a first plurality of corners, said wall faces and said first plurality of corners defining a first polygonal receiving space bounded at the top by a first open end and at the bottom by a second open end, each said wall face including at least one groove formed therein,
      a second polygonal receiving space defined by said grooves that is bounded at the top by said first open end and at the bottom by said second open end, and
   c. at least one radially inward extending ledge disposed within said first polygonal receiving space and located in a minority number of said first plurality of corners proximate said first open end,
   wherein
      when a work piece is received in said first polygonal receiving space, said at least one radially inward extending ledge prevents said work piece from passing through said first open end, and
      when said work piece is received in said second polygonal receiving space, said work piece can pass through said first open end.

* * * * *